July 21, 1925.

H. McGILL 1,546,497

METAL COVER FOR PNEUMATIC TIRES

Filed Aug. 29, 1924

Inventor
H. McGill
By Marks & Clerk
Attys

Patented July 21, 1925.

1,546,497

UNITED STATES PATENT OFFICE.

HENRY McGILL, OF CANTERBURY, VICTORIA, AUSTRALIA.

METAL COVER FOR PNEUMATIC TIRES.

Application filed August 29, 1924. Serial No. 735,010.

*To all whom it may concern:*

Be it known that I, HENRY McGILL, a subject of the King of Great Britain, residing at No. 42 Talbot Avenue, Canterbury, in the State of Victoria and Commonwealth of Australia, have invented Improvements in Metal Covers for Pneumatic Tires, of which the following is a specification.

The object of this invention is to provide an outer cover for pneumatic tires for motor vehicles, which will be flexible, resilient, and puncture proof.

My improvements in metal covers for pneumatic tires consist essentially of the combination with a series of partly circular strips (hereinafter called "the flanged strips") constructed of flexible and resilient metal, preferably steel, each strip having a flange on each side, which flange extends from near one end of each side to near the other end thereof, the flange on one side of one strip abutting against the flange on the opposite side of the adjacent strip, the ends of each strip being formed with a bead to engage with the rim of the wheel of a motor vehicle, of a series of partly circular plain strips (hereinafter called "the plain strips") constructed of flexible and resilient metal, preferably steel, said strips being on the outside of the afore-mentioned flanges, and each end of each strip being formed with a bead to engage with the rim of the wheel of a motor vehicle.

Referring to the sheet of drawings hereto annexed:

Figure 1:
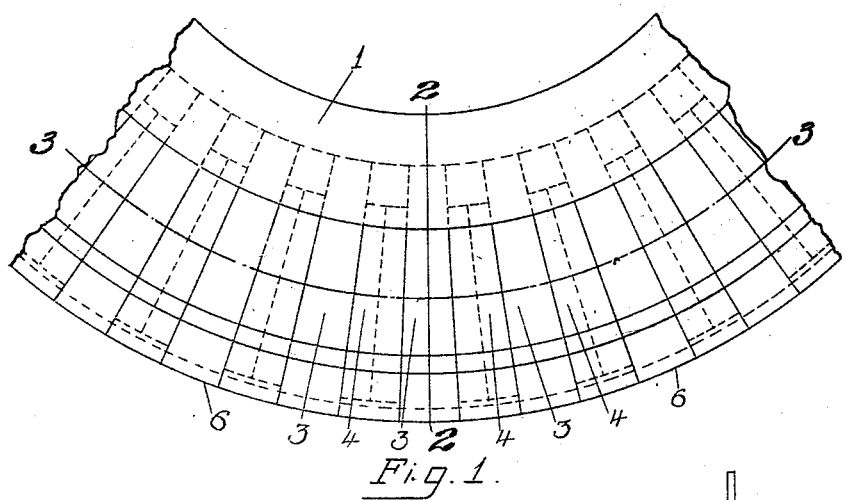
Figure 1 is a side elevation of portion of a metal cover for pneumatic tires made according to my invention, and in position on the rim of the wheel of a motor vehicle.
Figure 2:
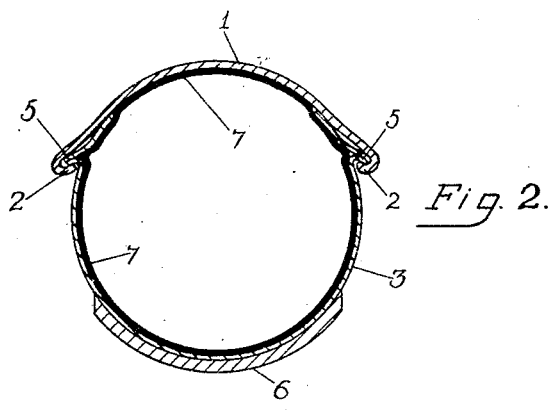
Fig. 2 is a sectional view taken on line 2—2 of Fig. 1.
Figure 5:
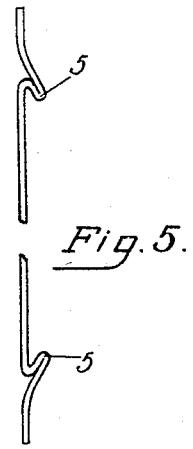
Figure 5 is a side elevation of the bead on the flanged and plain metal strips for connecting said strips to the rim of the wheel.
Figure 3:
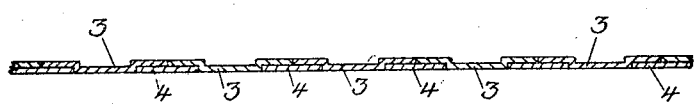
Fig. 3 is a circumferential sectional view taken on line 3—3 of Fig. 1.
Figure 4:
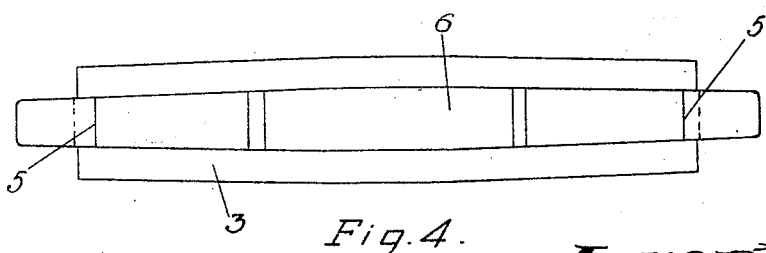
Figure 4 is a plan view of one of the flanged strips, before being moulded or pressed into a partly circular shape.

1 is the ordinary rim of the wheel of a motor vehicle, and 2 is the housing therein for the beads of the flanged and plain strips of flexible and resilient metal, of which my improved cover is composed. 3 are the flanged strips, and 4 are the plain strips, each made, as before stated, of flexible and resilient metal. 5 are the beads near each end of said strips. These beads are made, as more clearly shown in Figure 5, by bending the strips twice on themselves near the respective ends thereof. 6 is a tread plate composed preferably of aluminium and attached in any approved manner to each of the flanged and plain strips. 7 is the inner tube. When the parts of my improved metal cover are assembled, these sections are in contact one with the other, and constitute a complete tread.

In carrying out my invention, I take a sheet of metal, preferably steel, of say one twenty-fourth part of an inch in thickness, and cut it into strips twelve inches in length by one inch in width, such strips being subsequently tapered from the centre to a width of three quarters of an inch at each end. The said strips, which constitute the plain strips hereinbefore referred to, are then pressed in a specially constructed mould to a partly circular shape, viz: to about three-fourths of a circle. At the same time, each strip, near its end, is bent twice on itself to constitute a bead to engage with the rim of the wheel. The said strips are then placed in a tempering oven and hardened to the nature of an ordinary steel spring, after which each strip is fitted with a tread plate 6. I then take another sheet of the same gauge metal, and cut it into strips twelve inches in length by two inches in width, to constitute the flanged strips hereinbefore referred to, the said strips being subsequently tapered from the centre to a width of one and three quarters of an inch at each end. Both edges of these strips are then bent upwards in any approved manner at a point about half an inch from the edge of the said strips, and are then bent outwards, to constitute a horizontal flange on each side of the strip. The said strips are then pressed into a partly circular shape, viz: to about three-fourths of a circle, and, at the same time, each end of each strip, that is, the portion of the strip between the flanges, is bent twice on itself to constitute a bead to engage with the rim of the wheel. These flanged strips are then hardened in a tempering oven, as in the case of the plain strips, after which each strip is fitted with a tread plate 6.

In applying my improved metal cover to the rim of the wheel of a motor vehicle, I first lay the inner tube around the rim of the wheel and partly inflate it. I then take two of the flanged strips, and, pressing the ends of each strip toward one another, slip the beads into the housing of the rim of the wheel, so that they will be between the rim and the air tube, the inner surfaces of the flanges being in contact with said air tube (when inflated), the flange on one side of one strip, as before explained, abutting against the flange on the opposite side of the adjacent strip, thus leaving a space on the outside of each of the two abutting flanges. Into this space is inserted one of the plain strips, the beads on the ends thereof being caused to engage with the rim. These plain strips cover the meeting edges of the flanges and prevent dust or moisture getting into the tire. I then take one flanged strip and place alongside one of the others already placed in position, and insert another plain strip, as before stated, continuing the operation until the whole circumference of the rim is completely filled. The inflation of the inner tube is then completed, when the tire is ready for use.

I claim:

In a metal cover for pneumatic tires, the combination with a series of partly circular strips of flexible and resilient metal, each strip having a flange on each side extending from near one end of each side to near the other end thereof, the flange on one side of one strip abutting against the flange on the opposite side of the adjacent strip, the ends of each strip being formed with a bead to engage with the rim of the wheel of a motor vehicle, of a series of partly circular plain strips of flexible and resilient metal, said strips being on the outside of the aforementioned flanges, and each end of each strip being formed with a bead to engage with the rim of the wheel of the motor vehicle.

HENRY McGILL.